A. A. CARPENTER.
SAFETY AIR BRAKE APPLIANCE.
APPLICATION FILED NOV. 15, 1913.
1,090,274. Patented Mar. 17, 1914.
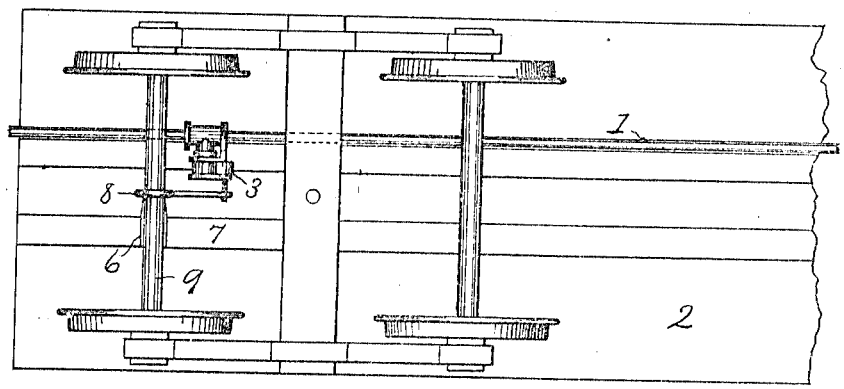
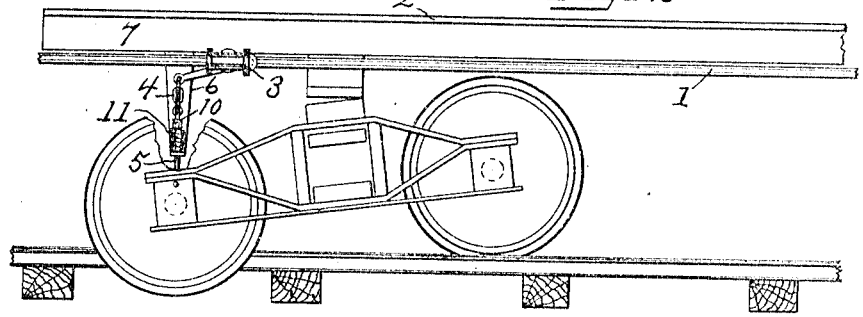
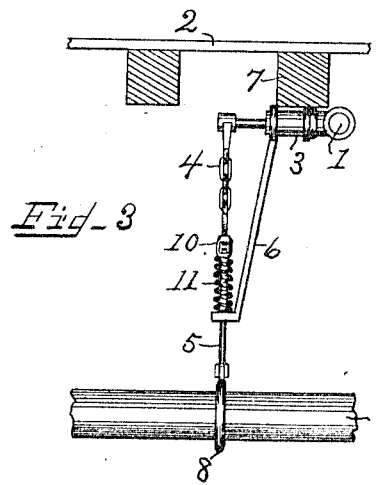
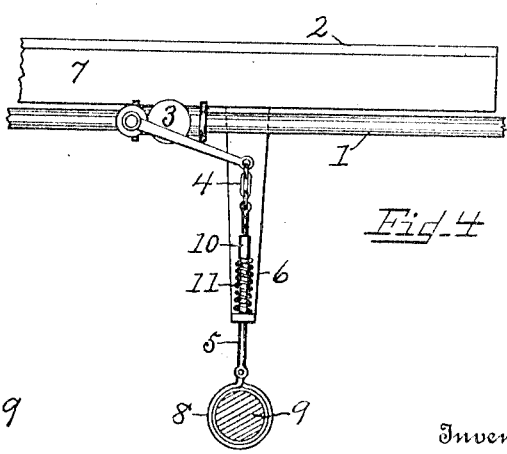
Witnesses.
O. R. Brame.
J. W. Blassingame.
Inventor.
Alfred A. Carpenter.
J. P. Dederick.
By
Attorney

UNITED STATES PATENT OFFICE.

ALFRED A. CARPENTER, OF SHERMAN, TEXAS.

SAFETY AIR-BRAKE APPLIANCE.

1,090,274. Specification of Letters Patent. Patented Mar. 17, 1914.

Application filed November 15, 1913. Serial No. 801,143.

*To all whom it may concern:*

Be it known that I, ALFRED A. CARPENTER, a citizen of the United States, residing at Sherman, in the county of Grayson and State of Texas, have invented certain new and useful Improvements in Safety Air-Brake Appliances, of which the following is a specification.

My invention relates to a safety air brake appliance for steam, traction, or other railways; the object being to provide a device for each car which will automatically and instantly apply the ordinary air brakes with which most cars are equipped, to the whole train the instant a single truck, for any cause leaves the rails, and without requiring special attention on the part of the train men to properly set the brakes at a critical moment.

By my invention the brakes are only automatically applied in case a truck leaves the track, and they are then actuated by substantially the same means as ordinarily when under manual control; which is by allowing air to escape from the train-line, thus reducing the pressure in the air cylinders connected with the brake mechanism. Obviously the usual means under the control of the train men to operate the brakes independently will not be interfered with by this emergency, automatic brake actuating mechanism.

The improvement consists of the novel features which hereinafter will be more fully described and claimed, and which have been shown in the accompanying drawings, in which—

Figure 1 is a bottom plan view, and Fig. 2 is a side elevation of a car showing the application of the invention, Fig. 3 is an enlarged detail view, in front elevation, of the device, Fig. 4 is a side view of the same.

The car is shown divested of all parts which would tend to confuse and render obscure the application of the invention; and such parts only are shown which are essential to properly illustrate the improvement. The air and friction brake system and connections may be of ordinary well-known type and needs no description.

Referring to the drawings, in which like numerals of reference denote corresponding parts in all of the figures, 1 designates the train-line pipe located and secured beneath the car body 2; in addition to the usual fittings it is provided with an auxiliary lever air-valve 3, and at the outer end of its lever is connected by chain 4 a rod 5, which extends downward and through a perforation in the depending bracket 6 that is secured to one of the floor timbers 7. The lower end of the rod 5 is connected with a ring 8 through which the truck axle 9 loosely passes, and the said rod is provided with a turn-buckle 10, which, together with the chain 4 enables the adjustment of the rod to a position admitting of the ordinary vertical and lateral movements of the car when empty or loaded, without moving the valve lever, but so it will draw the lever down, thus opening the valve and permit the escape of air from the train line should the wheels leave the track as shown in Fig. 2. A coiled spring 11 is provided for the rod 5, fitted between a projecting lug on the bracket 6 and the turnbuckle 10 by which the weight of the rod and chain are removed from the valve lever and the valve maintained in a closed condition under all normal operations. This being the general construction of the particular embodiment of my invention illustrated in the drawings, the operation thereof will be readily understood by those skilled in the art and may be briefly described as follows: Under normal conditions the valve 3 remains closed, leaving the usual air-brake system to be operated by the train men. This condition exists so long as all the car trucks remain on the track, but when by accident a truck leaves the rails, as shown in Fig. 2, the auxiliary valve 3 will be opened by the downward plunge of the car axle, permitting the escape of air from the train-line, which instantly and automatically applies all of the car brakes and brings the train to a standstill without any manual intervention.

Although I have specifically described the construction and relative arrangement of the several elements of my invention, I do not desire to be confined to the same, as such changes or modifications may be made as clearly fall within the scope of my invention without departing from the spirit thereof.

What I claim is—

In a safety air-brake appliance for cars, an auxiliary air valve attached to the train line pipe of a car, a depending perforated bracket secured to the car, a vertically movable rod in two parts joined by an adjusting turnbuckle the lower portion of said rod extending loosely through the perforation in the bracket and connected to a ring loosely encircling a truck axle, a spring operating on the rod portion to counterbalance its weight, and a chain normally connected to the upper end of the other section of the rod and to the valve lever, substantially as and for the purpose described.

In testimony whereof I affix my signature in presence of two witnesses.

ALFRED A. CARPENTER.

Witnesses:
O. R. BRAME,
J. W. BLASSINGAME.

Copies of this patent may be obtained for five cents each, by addressing the "Commissioner of Patents, Washington, D. C."